United States Patent
Habumuremyi et al.

(10) Patent No.: US 9,175,677 B2
(45) Date of Patent: Nov. 3, 2015

(54) METHOD FOR REGULATING A PUMP OF AN SCR SYSTEM

(75) Inventors: Jean-Claude Habumuremyi, Haaltert (BE); Volodia Naydenov, Louvain-la-Neuve (BE); Joel Op De Beeck, Lint (BE)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 259 days.

(21) Appl. No.: 13/521,611

(22) PCT Filed: Jan. 10, 2011

(86) PCT No.: PCT/EP2011/050230
§ 371 (c)(1),
(2), (4) Date: Aug. 27, 2012

(87) PCT Pub. No.: WO2011/083167
PCT Pub. Date: Jul. 14, 2011

(65) Prior Publication Data
US 2012/0324865 A1    Dec. 27, 2012

(30) Foreign Application Priority Data

Jan. 11, 2010  (FR) .................................. 10 50141

(51) Int. Cl.
*F04B 49/06* (2006.01)
*F04B 35/04* (2006.01)
(Continued)

(52) U.S. Cl.
CPC ............... *F04B 35/04* (2013.01); *F01N 3/208* (2013.01); *F04B 49/02* (2013.01); *F04B 49/06* (2013.01);
(Continued)

(58) Field of Classification Search
CPC ........... F04C 2270/07; F04C 2270/075; F04C 2270/08; F04C 2270/085; F04C 2270/03; F04C 2270/035; F04B 2203/0201; F04B 2203/0212; F04B 2203/0207; F04B 2203/0209; F04B 35/04; F04B 49/06; F04B 49/065; F04B 49/02; F01N 3/208; F01N 2610/1433; F01N 2900/1812; Y02T 10/24
USPC ........ 417/44.11, 44.2, 45; 318/432, 434, 459, 318/500, 400.34, 599, 811; 388/800, 806, 388/811, 819, 928.1; 60/272–324
See application file for complete search history.

(56) References Cited

U.S. PATENT DOCUMENTS 3,563,672 A * 2/1971 Bergstrom ..................... 417/45
6,370,888 B1   4/2002 Grabon
(Continued)

FOREIGN PATENT DOCUMENTS

EP   1 184 631         3/2002
JP   6-327277 A        11/1994
(Continued)

OTHER PUBLICATIONS

International Search Report issued on Mar. 1, 2011 in PCT/EP11/050230 filed on Jan. 10, 2011.
(Continued)

*Primary Examiner* — Peter J Bertheaud
*Assistant Examiner* — Dnyanesh Kasture
(74) *Attorney, Agent, or Firm* — Oblon, McClelland, Maier & Neustadt, L.L.P.

(57) ABSTRACT

A method for regulating a motor-driven pump of an SCR system, the pump delivering a pressure, being subjected to a hydraulic torque in relation to this pressure and also to a resistive torque and being driven by an electric motor including coils supplied with a current and developing a torque in relation to this current, according to which to regulate the pump, use is made of a mechanism to measure the current in the coils of the motor, of a regulator of overall current consumed by the motor, and of a model of the relation between the current and the pressure using an estimate of part of the resistive torque, namely the dry frictions, obtained by rotating the pump under no-load conditions at different speeds and by measuring the associated current.

14 Claims, 6 Drawing Sheets

(51) Int. Cl.
  *F01N 3/20* (2006.01)
  *F04B 49/02* (2006.01)

(52) U.S. Cl.
  CPC ....... *F04B 49/065* (2013.01); *F01N 2610/1433* (2013.01); *F01N 2900/1812* (2013.01); *F04B 2203/0201* (2013.01); *F04B 2203/0209* (2013.01); *Y02T 10/24* (2013.01)

(56) References Cited

U.S. PATENT DOCUMENTS

| | | | |
|---|---|---|---|
| 6,577,089 | B1 | 6/2003 | Piedl et al. |
| 6,695,994 | B2 * | 2/2004 | Bulgrin et al. ............... 264/40.1 |
| 8,012,170 | B2 * | 9/2011 | Whitman et al. ............ 606/219 |
| 2003/0206805 | A1 | 11/2003 | Bishop et al. |
| 2004/0064292 | A1 | 4/2004 | Beck et al. |
| 2006/0276999 | A1 | 12/2006 | Beck et al. |
| 2009/0084095 | A1 * | 4/2009 | Dalton ............................ 60/301 |
| 2009/0101656 | A1 | 4/2009 | Leonard |
| 2010/0043409 | A1 | 2/2010 | Naydenov et al. |

FOREIGN PATENT DOCUMENTS

| | | |
|---|---|---|
| JP | 2001-342989 A | 12/2001 |
| RU | 2285150 C2 | 10/2006 |
| WO | 2006 064028 | 6/2006 |
| WO | 2008 087153 | 7/2008 |
| WO | 2009 028466 | 3/2009 |
| WO | WO 2009/112516 A1 | 9/2009 |

OTHER PUBLICATIONS

Office Action issued Aug. 25, 2014, in Japanese Patent Application No. 2012-547521 with English translation.

Office Action issued Apr. 1, 2015 in Russian Patent Application No. 2012134339 (with English translation).

* cited by examiner

METHOD FOR REGULATING A PUMP OF AN SCR SYSTEM

The present invention relates to a method of regulating a pump of an SCR system and also to a system that makes it possible to apply this method.

With the Euro IV standard on exhaust emissions in particular from heavy duty trucks coming into effect in 2005, devices for pollution control of NOx (or nitrogen oxides) had to be put in place.

The system used by most heavy duty trucks manufacturers for reducing $NO_x$ emissions to the required value generally consists in carrying out a selective catalytic reaction with reducing agents such as urea ("Urea SCR" or selective catalytic reduction using ammonia generated in situ in the exhaust gases by decomposition of urea).

In order to do this, it is necessary to equip the vehicles with a tank containing a urea solution, with a device for metering the amount of urea to be injected into the exhaust line and with a device for supplying, with urea solution, the device for metering the amount of urea to be injected. Generally, the supply device comprises a pump driven by a motor.

In the prior art, several systems have been proposed for controlling the operation of such a pump.

Application WO 2008/087153 in the name of the Applicant describes a method for controlling the operation of a pump of an SCR system, this pump being driven by an electric motor and controlled by a controller, according to which an ECM (Electronic Control Module) sends, to the controller, a PWM (Pulse Width Modulation) control signal having a duty cycle that varies as a function of the desired operating conditions for the pump and according to which the controller acts on the electric motor to apply said operating conditions to the pump.

In this method, in order to ensure that the pump delivers at the operating pressure as quickly and as accurately as possible (or in other words: that the outlet pressure of the pump is rapidly and correctly aligned with the setpoint pressure sent by the ECM), the controller is connected to a pressure sensor and the system comprises a pressure regulator (generally of PID (proportional-integral-derivative) type) and an electric motor rotational speed controller. This makes it possible, in a loop, to compare the pressure setpoint value, where appropriate (i.e. when the pump is running), with the value measured by the sensor and consequently to act on the rotational speed of the motor by means of the rotational speed controller.

Generally, the regulator carries out the comparison between the desired pressure and the pressure measured and generates an error signal for the motor rotational speed controller.

Although this method gives good results in practice, it involves the use of a pressure sensor which is in fact an expensive device that may constitute a substantial part of the total cost of the system.

Moreover, the pressure sensor often does not withstand freezing well and may deteriorate or cause deviations due to this phenomenon. A control without a pressure sensor would avoid this problem.

However, in some versions of SCR systems—especially those using a motor of the brushed or brushless DC motor type (the latter being referred to as brushless DC or BLDC motor), where the pump is optionally driven by a magnetic coupling between the stator and the rotor of the pump, which coupling is itself attached to a mechanical drive shaft of the motor-information relating to the rotational speed of the pump motor and to the current in the coils of the motor are available automatically (especially for carrying out the diagnosis of the system) so that there is no need to install a specific sensor to measure them.

The Applicant had the idea of studying this information and found that from the measurement of the current it was possible to establish an image of the pressure within a tolerance margin of ±0.5 bar around the requested pressure value.

Indeed, it is possible to model a bidirectional supply, radial, three-phase DC motor by means of the following equations:

$$u = 2Ri + 2(L-M)\frac{di}{dt} + 2e' \qquad (1)$$

$$e' = \lambda\omega \qquad (2)$$

$$C_m = 2\lambda i \qquad (3)$$

$$J\frac{d\omega}{dt} = C_m - C_r \qquad (4)$$

where
R: is the resistance of a coil
L: the self-inductance of a coil
M: the mutual inductance of one coil with the others
i: the constant commutation current in the coils
e': the back-electromotive force
ω: the rotational speed
$C_m$: the motor torque
$C_r$: the resistive torque
λ: the torque constant defined for a single phase.

Equivalent equations can be obtained with the other types of DC motors (unidirectional supply, radial, three-phase; triangular three-phase; bidirectional supply, radial, four-phase; etc.).

If we consider, in a first approximation, that we are working under steady state (non-transient) conditions, equations (1), (2), (3) and (4) become:

$$u = 2Ri + 2e' \Rightarrow i = \frac{u - 2e'}{2R} \qquad (5)$$

$$e' = \lambda\omega \qquad (6)$$

$$C_m = 2\lambda i \qquad (7)$$

$$C_m = C_r \qquad (8)$$

Figure 1:
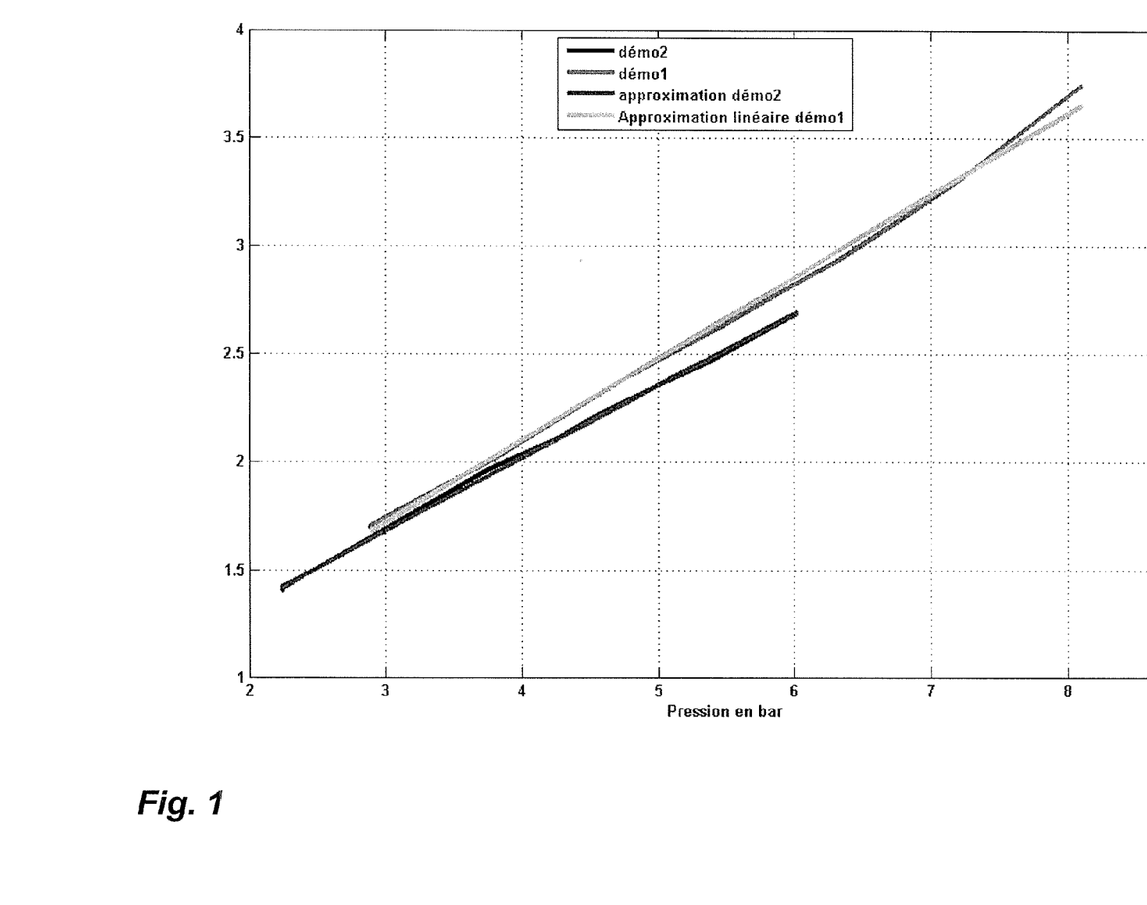
FIG. 1 shows a graph of pressure verses current in an embodiment of the invention.

In order to validate these formulae, the Applicant has carried out tests on several systems having motors, pumps, lines, etc. with the same characteristics. FIG. 1 shows the tests carried out on 2 "different" systems (having identical characteristics but inevitably components resulting from different production runs). With these 2 systems, it can be seen that by making a current loop regulation of 2.5 A (demo1) for the first system and of 2.4 A (demo2) for the second, a pressure of 5 bar is obtained, a value which is commonly used in practice. If, for the 2 systems, a current control loop regulation of 2.4 A were to be used, 5 bar would naturally be obtained for the second system and around 4.75 bar for the first one. The latter pressure is acceptable as it lays within the ±0.5 bar tolerances required in many SCR projects. The same applies if a current value of 2.5 A is used. Therefore by taking one of these 2 values, at least for the 2 systems used, the pressure would vary between 4.5 bar and 5.5 bar and therefore would satisfy the aforementioned ±0.5 bar tolerance margin.

The difference between the reference values of the current of the two systems for a given pressure may be explained by the mechanical resistance (the dry friction in the bearings for example) and the viscous friction (dependent on the rotational speed such as the resistance caused by the ventilation) which may be different. The manufacturing tolerances of the systems may also lead to differences in the internal resistive torques and the ferromagnetic losses.

Figure 2:
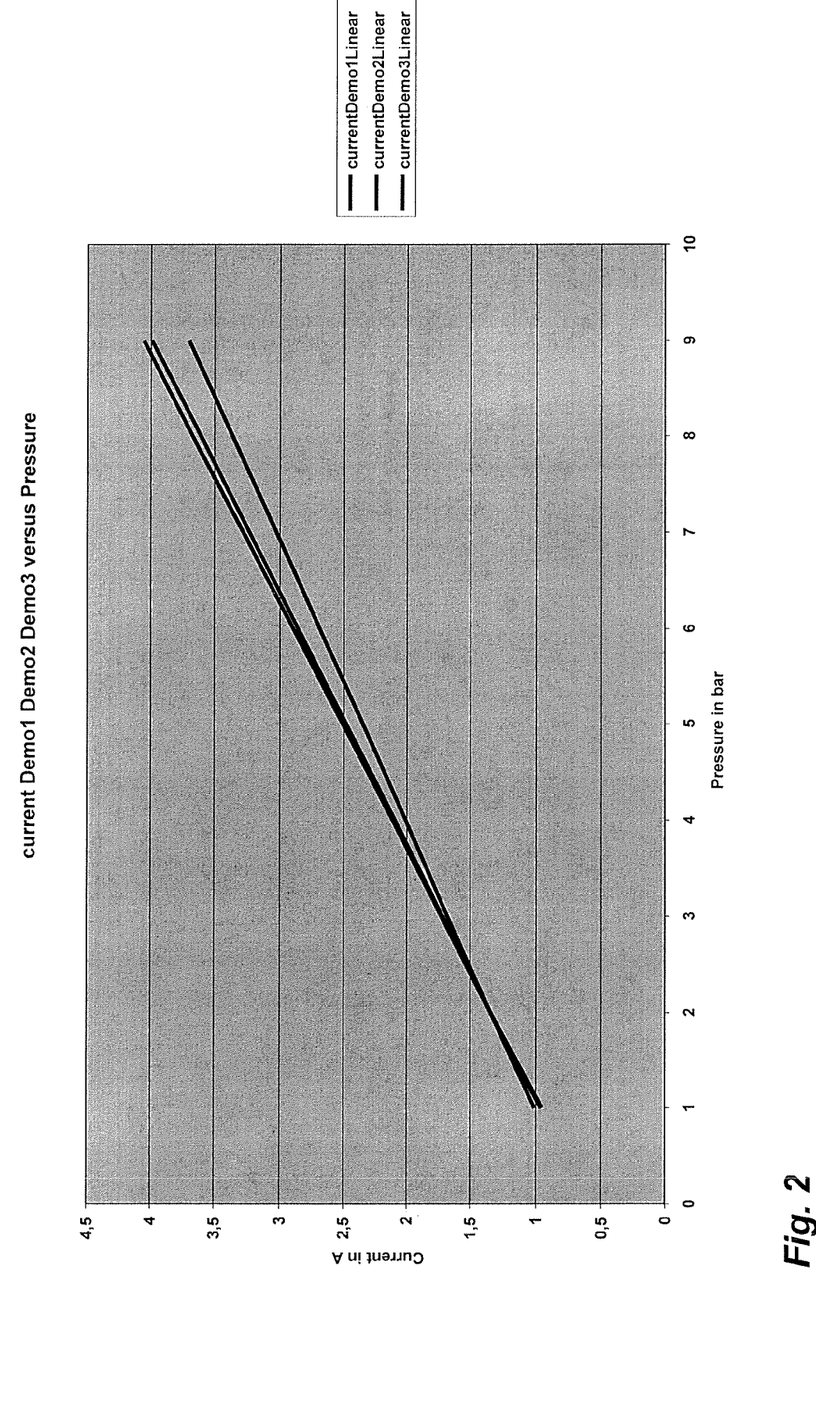
FIG. 2 shows a graph of pressure verses current in a further embodiment of the invention.

A test with a third system, but this time under actual conditions with a PID controller exploiting the current information (without opening the injector) made it possible to show that the pressure fluctuations were of the order of 0.22 bar using an average current of 2.5 A this time, giving an average pressure of 5.077 bar. The appended FIG. 2 gives the result of this test, linearized and superposed on the results (also linearized) of the 2 others.

Figure 3:
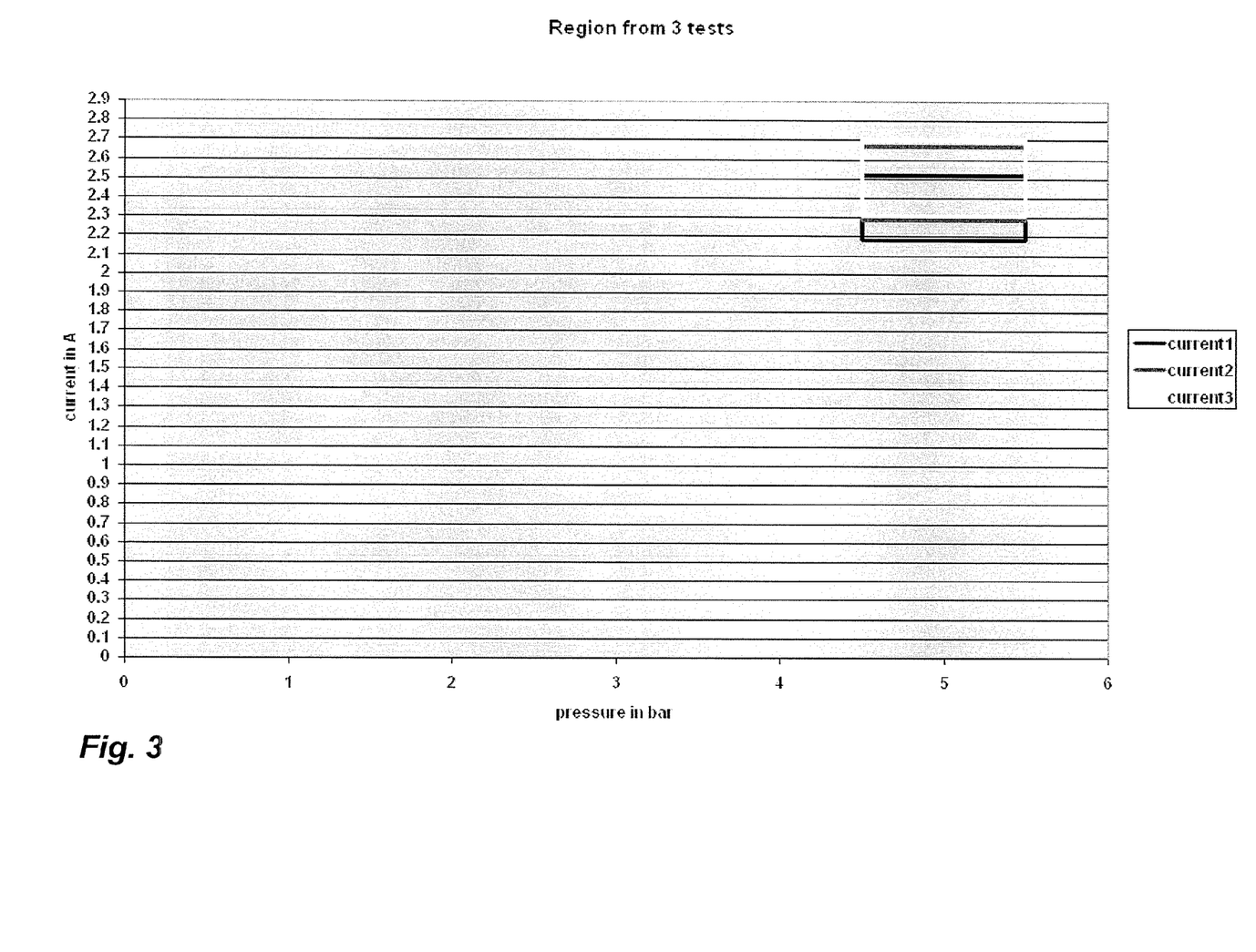
FIG. 3 shows a graph of pressure verses current relating to grouping together of multiple test sets according to an embodiment of the invention.

FIG. 3 groups together the regions of the 3 test sets carried out for a reference pressure of 5 bar (often required by the car manufacturers). For each test set, the minimum value of the current which corresponds to 4.5 bar and the maximum value corresponding to 5.5 bar were determined in order to respect the ±0.5 bar tolerance, and rectangles delimited by these values were plotted, therefore including all the pump operating points between these values. The intersection of these three regions gives the acceptable current margin for the three systems (i.e. the operating points which respect the tolerance on the pressure setpoint). FIG. 3 shows that by taking a reference current of 2.4 for the control loop, the margin of ±0.5 bar is satisfied for the 3 systems with 5 bar as setpoint.

In fact, the idea on which the present invention is based can be applied to any pump driven by an electric motor.

Indeed, with this type of pump, generally Cm=Ch+Cr where Cm is the motor torque (or the input torque generated by the motor in order to drive the pump and to overcome the mechanical and ferromagnetic losses), which is proportional to the current, i.e. Cm=K1×I (with K1=a constant); Ch is the hydraulic torque which is proportional to the pressure, i.e. Ch=K2×p (with K2=another constant); and Cr is the resistive torque resulting mainly from the dry and viscous frictions in the pump and therefore is a constant for a given pump with a given fluid (although it slightly varies with the rotational speed of the motor). Finally, as a first approximation, we have: K1×I=K2×p+Cr, i.e. a linear relationship between the current and the pressure which makes the present invention applicable to this type of pump.

As explained above, this is however an approximation and, in the case of an SCR system that has to operate at ±0.5 bar around the required pressure value, this approximation might not be precise enough.

This approximation may however be substantially improved at least if one is able to determine Cr exactly (in order to deduce it from Cm and to obtain the hydraulic torque, proportional to the pressure). In fact, Cr is related to the current and may vary from one system to another as a function of the mechanical tolerances, the assembly, the rotational speed of the motor, etc, and it is the sum of the dry frictions and of the viscous frictions in the pump. In practice, the contribution of the dry frictions may be determined by measuring the current under no-load conditions at the very start of the pressurization of the system.

This way of proceeding is very easy to carry out in the case of an SCR system. Indeed, SCR systems must be purged after each shutdown of the motor so that at each start, the pump is empty and the system is under no-load conditions. To purge the system, it suffices to rotate the pump in reverse direction. When the motor afterwards rotates in the pressurization direction, the supplementary current will be due only to the hydraulic part and will be in correlation (almost linear relationship) with the pressure.

The viscous contribution to Cr will be determined from durability tests of the pump by considering the variations in this resistance as a function of the ageing of the pump. This contribution is not included in the Cr estimate used in the method of the invention but instead, is implicitly incorporated in the above equation (K1×I=K2×p+Cr) by making the constants K1 and K2 vary so that in fact, said linear equation/relation becomes a more sophisticated relation that will be established based on many experimental points obtained on several different pumps, under many different working conditions for which current, pressure, age of the pump, rotational speed, temperature will be measured. To find this relation/model, methods like LMS (Least Mean Square), weighted LMS, Neuro-fuzzy . . . can be applied to said data, preferably after a model has been established. The model can be of the following types: FIR (Finite Impulse Response), IIR (infinite Impulse Response), Box-Jenkins, ARMAX . . . .

Hence, the present invention relates to a method for regulating a motor-driven pump of an SCR system, said pump delivering a pressure, being subjected to a hydraulic torque in relation to this pressure and also to a resistive torque and being driven by an electric motor comprising coils supplied with a current and developing a torque in relation to this current, according to which in order to regulate the pump, use is made of a means for measuring the current in the coils of the motor, of a regulator of the overall current consumed by the motor, and of a model of the relation between the current and the pressure using an estimate of part of the resistive torque (the dry frictions namely) obtained by rotating the pump under no-load conditions at different speeds and by measuring the associated current.

Preferably, the estimation of part of the resistive torque (or "Cr") is carried out during or right after a purge of the SCR system conducted by reversing the flow of the pump, or at starting of said system. Such a purge method is described in Application WO 2006/064028 in the name of the Applicant, the content of which is, for this purpose, incorporated by reference in the present application. In practice, in order to reverse the flow of the pump, use is preferably made of either a switch that enables the flow of the pump to be reversed directly (by reversing its rotational direction); or a 4/2-way valve which, by means of suitable couplings/lines, produces the same effect. A purge by rotating the motor in the reverse direction is preferred within the context of the present invention.

Motors which are suitable within the context of the invention are brushed or brushless DC motors and AC motors, preferably of induction type. In particular, DC motors are highly suitable. The invention gives good results with magnetically-coupled DC motors.

As regards the means for measuring the current, these generally consist of at least one current sensor (or even 2 in the aforementioned case of radial, three-phase motors).

Hence, the invention relates, in particular, to a method for regulating a pump as described above where the motor is a DC motor comprising magnetic coils, and according to which in order to regulate the pump pressure, use is made of sensors of the current flowing in the coils of the motor and of the overall current regulator.

According to a first aspect, the invention relates to a method as described above that uses a computer, sensors of the current flowing in the coils, a regulator of the overall current consumed by the motor and a motor rotational speed controller, according to which:

the computer calculates a current setpoint based on a pressure setpoint;

the current regulator compares, in a loop, the actual value of the current measured by the current sensor with its setpoint value and generates an error signal for the motor rotational speed controller depending on the result of this comparison, so that this controller modifies the rotational speed of the motor in order to minimize the error.

Figure 4:
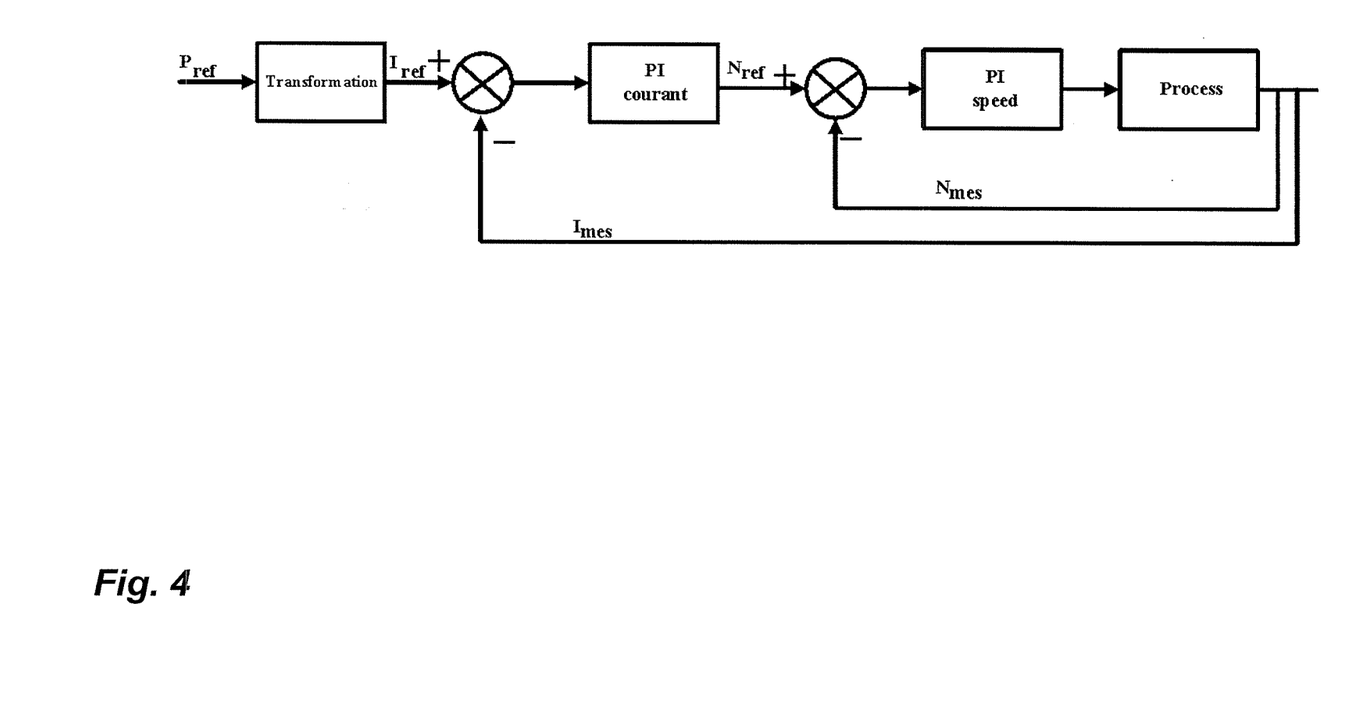
FIG. 4 shows features relating to a method for regulating a pump of an SCR system according to an embodiment of the invention.

This principle is explained and illustrated non-limitingly with the aid of the appended FIG. 4, in which it can be seen that, generally, the error signal consists of a new setpoint of the rotational speed of the motor and the speed controller comprises a speed regulator which compares this setpoint value with the actual value of the speed read by a speed sensor, or that calculated from the back-EMF or back-electromotive force (for a DC motor this is defined in the formulae above), and this being in a loop also. This calculation is preferably carried out by the FCU.

Preferably, the current regulator is of PID type and preferably the speed regulator is also of PID type too. Other types of regulator can be used all the same, such as those based on fuzzy logic, robust control, optimal control, etc.

According to a second aspect, the present invention relates to a method for controlling the operation of a pump driven by a DC motor comprising magnetic coils and that uses a computer and a regulator of the current flowing in the coils, which comprises the following steps:

the computer calculates a current setpoint based on a pressure setpoint;

the current regulator compares, in a loop, the actual value of the current measured by the current sensor with its setpoint value and generates a command signal for the voltage applied to the coils of the BLDC motor so that this controller modifies the voltage in the coils of the motor in order to minimize the error between the current setpoint and the current measurement.

This variant is based on the idea that a speed controller is not necessarily needed, since the voltage in the coils (phases) of the BLDC motor may be/is calculated directly by the current regulator, the motor speed being an image of the applied voltage.

Figure 5:
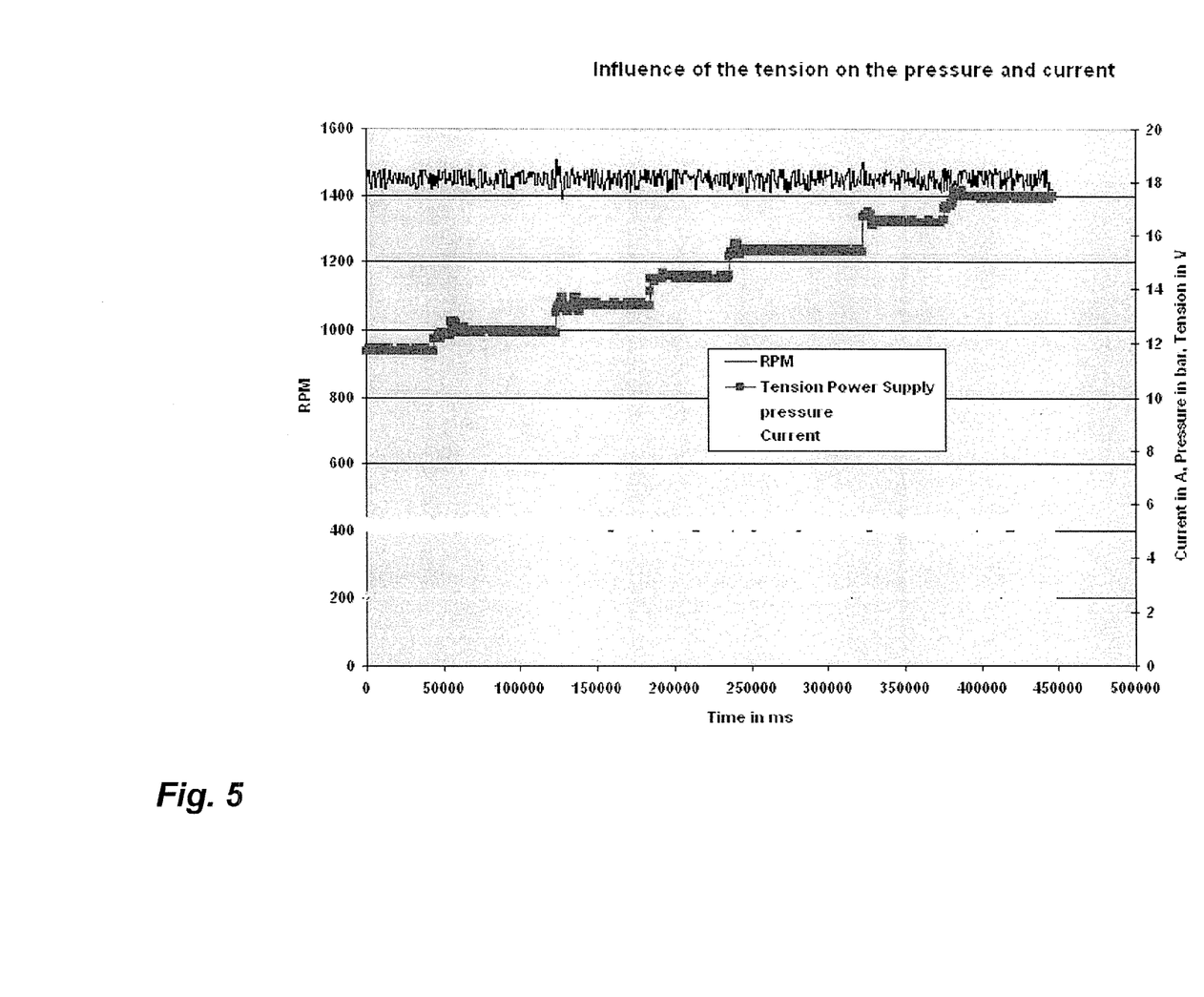
FIG. 5 shows a graph relating to the influence of tension on pressure and current.

Equations (5), (6), (7) and (8) show the various variables that must be considered in order to validate our concept. It is seen in equation (5) that the current is a function of the supply voltage of the motor. In a motor vehicle, this voltage may vary from 9 to 17 V, which is not inconsiderable. The Applicant has carried out tests on various supply voltages as shown in FIG. 5. These variations had no influence on the current due to the speed control. Indeed, when the voltage is increased, the current and the speed have a tendency to increase but as regulation is provided firstly as a current loop (which acts to decrease the speed setpoint (the PWM)) then as a speed loop, the current does not change.

The same is true for the temperature (second parameter to be considered) since when the temperature increases, the resistance increases and therefore the current (and hence the pressure too) has a tendency to decrease and the current control loop will act to maintain the reference current by increasing the speed. The pump to which the method according to the invention applies may be, for example, a gear pump or a diaphragm pump. The invention gives good results with a gear pump. Indeed, this type of pump makes it possible to operate with good efficiency in two opposite rotational directions, one corresponding in general to supplying a feed line with liquid and the other corresponding to a purge of the feed line. The choice of a magnetically-coupled gear pump is particularly advantageous since it makes it possible to do without a dynamic seal.

According to the preferred variant described above, the pump is controlled using a current regulator and a speed controller that generally comprises a speed regulator.

Generally, the setpoint pressure is communicated to the computer by an ECM which sends it a control signal, preferably of PWM (Pulse Width Modulation) type, which includes information relating to the operating conditions of the pump, as in the aforementioned international application in the name of the Applicant and incorporated by reference in the present application. These conditions are understood to denote the setpoint pressure and also at least one other piece of information such as its stopping/blocking, its rotational direction, etc. They are preferably all the operating conditions of the pump, namely: stopping, forward drive, reverse drive, operating pressure (at the pump outlet), etc. so that the pump operation is entirely conditioned by a single signal. In other words: the controller receives coded instructions (in the form of a PWM signal of variable duty cycle) telling it if it must stop the pump or rotate it forwards, in reverse and at what pressure, which it does by acting on the electric motor, i.e. generally by in turn sending it a voltage signal which may be of PWM type.

The ECM within the context of the invention is either an ECM specific to the SCR function or an ECM integrated into the ECM of the internal combustion engine (or ECU=Engine Control Unit).

The same is true for the computer that receives the pressure setpoint value and calculates the corresponding setpoint current: it may either be integrated into the ECU, or be integrated into an ECM specific to the SCR system, also sometimes referred to as FCU or Flange Control Unit, the various active components of an SCR system sometimes being integrated into a common base plate located in or on the tank containing the liquid. In this variant, the FCU preferably integrates at least the pump speed controller.

Similarly, the current regulator used in the method of the invention may also be integrated into the ECU or into the FCU. The second alternative (where the current regulator is integrated into the FCU) is preferred. Very particularly preferably, all the computers and the regulators are integrated into the FCU which receives only the pressure setpoint from a separate ECM.

Figure 6:
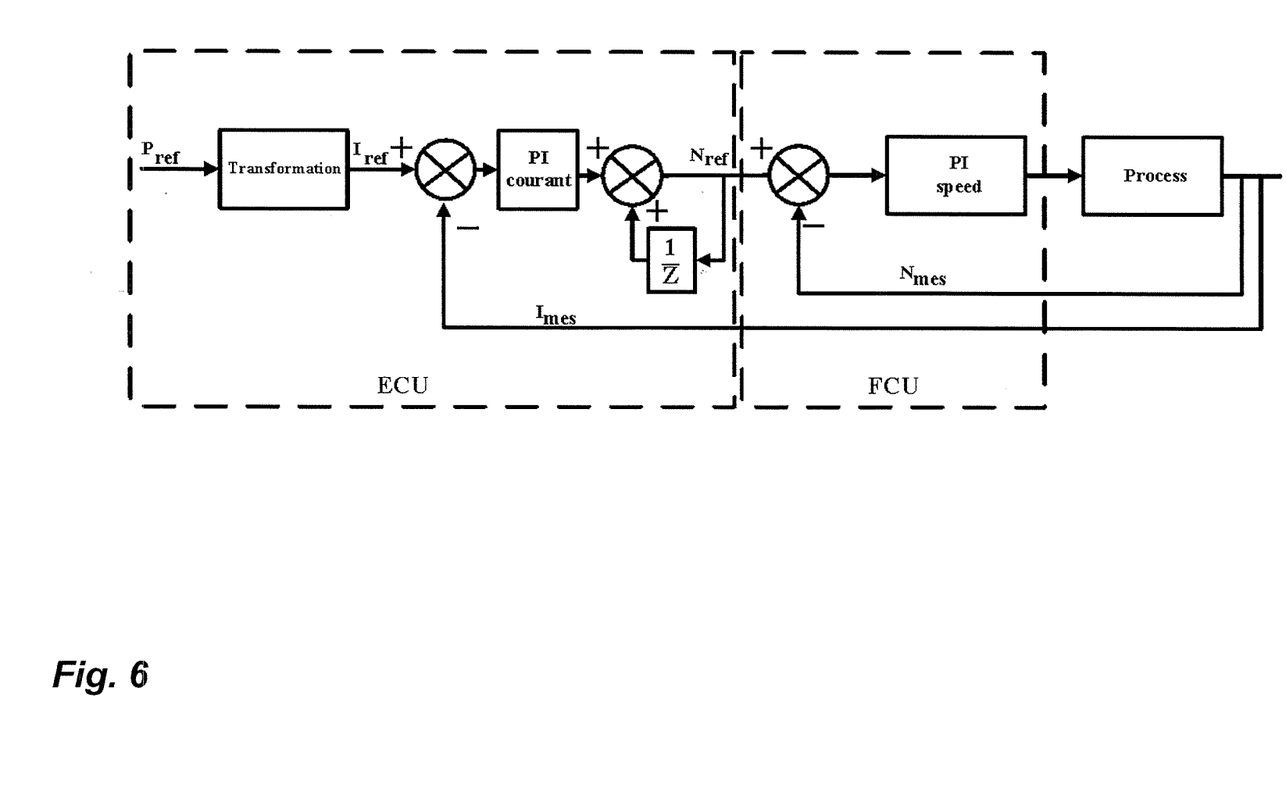
FIG. 6 shows features relating to a method for regulating a pump of an SCR system according to a further embodiment of the invention.

In a $1^{st}$ variant of the invention, the current regulator directly calculates the speed setpoint to be sent (generally via a CAN) to the speed controller—this is the variant illustrated by the appended FIG. 4. In a $2^{nd}$ sub-variant, the current regulator calculates a modification of the speed (error signal) then adds it to the former speed value stored and sends the result to the speed controller (this method is more effective since, by passing via the CAN communication, the control loop has a long response time). This is a second variant of the invention illustrated by the appended FIG. 6.

The present invention also relates to a system for supplying a liquid additive for the exhaust gases of an internal combustion engine, said system being suitable for the method described above and for this purpose comprising:
- a pump enabling said additive to be supplied from a tank into the exhaust gases;
- a brushed DC motor or a BLDC motor that makes it possible to drive the pump;
- a means for measuring the total supply current in the coils of the motor;
- a regulator of this current;
- a motor rotational speed controller; and
- a computer for calculating a current setpoint on the basis of a pressure setpoint.

For this purpose, the computer preferably uses an algorithm that takes into account the variability of the resistive torque with the speed. According to one particularly preferred variant, this algorithm also takes into account the temperature (which has a severe effect on the viscosity) and/or the influence of pump ageing (drift, over time, of the aforementioned parameters K1 and K2).

The additive in question within the scope of this variant of the invention is preferably a reducing agent capable of reducing the $NO_x$ present in the exhaust gases of internal combustion engines. This is advantageously an ammonia precursor in aqueous solution. The invention gives good results with eutectic solutions of urea in water for which there is a standard quality: for example, according to the standard DIN 70070, in the case of the AdBlue® solution (commercial water/urea solution), the urea content is between 31.8% and 33.2% (by weight) (i.e. 32.5±0.7 wt %) hence an available amount of ammonia between 18.0% and 18.8%.

The invention may also be applied to the urea/ammonium formate mixtures sold under the trade name Denoxium™ and of which one of the compositions (Denoxium-30) contains an equivalent amount of ammonia to that of the AdBlue® solution. The latter have the advantage, with respect to urea, of only freezing from −30° C. onwards (as opposed to −11° C.), but have the disadvantages of corrosion problems linked to the possible release of formic acid.

This variant of the present invention may be applied to any internal combustion engine. It is advantageously applied to diesel engines, and in particular to the diesel engines of heavy goods vehicles.

Preferably, the system according to this variant of the invention is generally also equipped with an injector enabling the additive to be injected into the exhaust gases. This injector may be of any known type. It may, for example, be an "active" injector, that is to say one that includes the metering function.

Usually, the system according to the invention comprises a computer connected to the injector and allowing the required amount of additive to be injected into the exhaust gases (in particular as a function of the following parameters: emission level and degree of conversion of the $NO_x$; temperature and pressure; engine speed and load, etc. and, optionally, the quality (state of ageing) of the solution).

In certain cases, the entire additive flow provided by the pump is not injected in to the exhaust gases and the un-injected part must then be recirculated. Advantageously, this is done with a return loop (line) comprising a calibrated orifice or a calibrated valve and a non-return valve. Indeed, in one preferred variant of the invention, the pump intentionally meters too great an amount (pressure) of liquid, the excess of which is returned to the tank via the aforementioned line.

When the urea is injected into the exhaust gases of an engine, this variant makes it possible to cool the injector. In this variant, the non-return valve is used to prevent the liquid from going round in circles (in the loop created by the feed line and that for return to the tank) during the purge (which may for example be carried out by rotating the pump in reverse) and the calibrated orifice (restriction) is used to set the flow rate and to add resistance in order to increase the pressure (by increasing pressure drops in the return line).

Such elements are especially described in Application WO 2008/155303 in the name of the Applicant (and incorporated by reference in the present application), the principle of which may be applied within the context of the present invention, but by replacing the measurement of the pressure with that of the current. Hence, according to another aspect, the invention also relates to a process for the start-up of the pump of the system described above, according to which:
1. the temperature (T1) of the liquid held in the tank is determined and compared to a setpoint temperature (T0);
2. if the temperature (T1) is greater than the setpoint temperature (T0), the pump is actuated;
3. if the temperature (T1) is less than or equal to the setpoint temperature (T0), the tank and the pump are heated for a time t1; then
4. the pump is actuated for a time t2 during which the pump outlet pressure is estimated by the measurement of the current. This phase may be preceded by an evacuation of the air trapped during the purge of the system and by a filling of the lines;
5. if this estimated pressure is steady and within an acceptable margin, the pump is kept going;
6. if this pressure is not steady and/or is not in the acceptable margin of the setpoint pressure, the pump is stopped and the tank is heated for a time t3, at the end of which steps 4 to 6 are repeated.

In other words, in this variant of the invention, before regulating the pump in terms of current as explained above, it is started as described above, the philosophy being, both in the control of the start-up procedure and in that of the pump operation, to use a current measurement and not a pressure measurement, for the reasons explained above.

The invention claimed is:

1. A method for regulating a motor-driven pump of an SCR system having an injection mode and a purge mode, the method comprising:
   delivering a pressure with the pump, the pump being subjected to a hydraulic torque in relation to this pressure and also to a resistive torque and being driven by an electric motor comprising coils supplied with a current and developing a torque in relation to this current; and
   regulating the pump speed in the injection mode, by using a means for measuring the current in the coils of the motor, a regulator of the overall current consumed by the motor, and a model of the relation between the overall current, the part Cr of said resistive torque due to dry frictions, and the pressure, wherein said model uses the equation $K1 \cdot I = K2 \cdot p + Cr$, wherein K1 and K2 are constants, I is the overall current, p is the pressure, and Cr is an estimate of said part of the resistive torque due to dry frictions obtained by rotating the pump under no-load conditions at different speeds and by measuring the associated current; and
   regulating the motor-driven pump based on the model using the equation.

2. Method according to claim 1, according to which the estimation of part of the resistive torque is carried out during or right after a purge of the SCR system realized by reversing the flow of the pump, or at the start of said system.

3. Method according to claim 2, according to which the purge is carried out by reversing the direction of rotation of the pump.

4. Method according to claim 1, according to which the motor is a DC motor and according to which use is made of sensors of the current flowing in the coils of the motor and of the overall current regulator in order to regulate the pump pressure.

5. Method according to claim 4, further using a computer and a motor rotational speed controller, and comprising the following steps:
- the computer calculates a current setpoint based on a pressure setpoint;
- the current regulator compares, in a loop, the actual value of the current measured by the current sensor with its setpoint value and generates an error signal for the motor rotational speed controller depending on the result of this comparison, so that this controller modifies the rotational speed of the motor in order to minimize the error between the current setpoint and the current measurement.

6. Method according to claim 5, wherein the error signal consists of a new setpoint of the rotational speed of the motor and wherein the speed controller comprises a speed regulator which compares this setpoint value with the actual value of the speed read by a speed sensor, or that calculated from the back-electromotive force of the motor.

7. Method according to claim 6, wherein the current regulator and the speed regulator are of PID type.

8. Method according to claim 4, using a computer and a regulator of the current flowing in the coils, this method comprising the following steps:
- the computer calculates a current setpoint based on a pressure setpoint;
- the current regulator compares, in a loop, the actual value of the current measured by the current sensor with its setpoint value and generates a command signal for the voltage applied to the coils of the BLDC motor so that this controller modifies the voltage in the coils of the motor in order to minimize the error between the current setpoint and the current measurement.

9. Method according to claim 1, wherein the pump is a gear pump.

10. Method according to claim 5, wherein the setpoint pressure is communicated to the computer by an ECM which sends it a PWM control signal that includes information relating to the pump operating conditions.

11. Method according to claim 5, wherein the current regulator directly calculates the speed setpoint to be sent (generally via a CAN) to the speed controller.

12. Method according to a claim 5, wherein the current regulator calculates a modification of the speed (error signal) then adds it to a former speed value stored and sends the result to the speed controller.

13. System for supplying a liquid additive for exhaust gases of an internal combustion engine, said system comprising:
- a pump enabling said additive to be supplied from a tank to the exhaust gases and which can be regulated by a method according to claim 1;
- a brushed DC motor or a BLDC motor that makes it possible to drive the pump and that comprises coils;
- sensors for determining the total current flowing in the coils of the motor;
- a regulator of this current;
- a motor rotational speed controller; and
- a computer for calculating a current setpoint on the basis of a pressure setpoint.

14. Method for controlling a system according to claim 13, using a method of regulation and including the control of the start-up of the pump according to the following steps:
(1) the temperature of the liquid held in the tank is determined and compared to a setpoint temperature;
(2) if the temperature is greater than the setpoint temperature, the pump is actuated;
(3) if the temperature is less than or equal to the setpoint temperature, the tank and the pump are heated for a time t1; then
(4) the pump is actuated for a time t2 during which the pump outlet pressure is estimated by the measurement of the current;
(5) if this estimated pressure is steady and within an acceptable margin, the pump is kept going;
(6) if this pressure is not steady and/or is not within the acceptable margin of the setpoint pressure, the pump is stopped and the tank is heated for a time t3, at the end of which steps (4) to (6) are repeated.

* * * * *